United States Patent [19]

Elmore et al.

[11] Patent Number: 4,897,157
[45] Date of Patent: Jan. 30, 1990

[54] MAKE-UP LIQUOR AND BLACK LIQUOR EVAPORATING PROCESSING DURING PULP PRODUCTION

[75] Inventors: Carl L. Elmore; Mark A. Mullen, both of Glens Falls; George D. Emery, Fort Miller; Timothy R. Carter, Lake George, all of N.Y.

[73] Assignee: Kamyr, Inc., Glens Falls, N.Y.

[21] Appl. No.: 170,077

[22] Filed: Mar. 15, 1988

Related U.S. Application Data

[63] Continuation of Ser. No. 883,315, Jul. 8, 1986, abandoned.

[51] Int. Cl.[4] ............... B01D 1/26; D21C 11/06; D21C 11/10
[52] U.S. Cl. ..................... 162/240; 162/37; 162/47; 159/47.3
[58] Field of Search ............. 159/47.3, 17.1; 162/46, 162/39, 47, 40, 37, 240, 250

[56] References Cited

U.S. PATENT DOCUMENTS 2,942,657  6/1960  Kleinschmidt .............. 159/17.1
4,401,516  8/1983  Olson et al. .................. 162/47

FOREIGN PATENT DOCUMENTS 1049713  3/1979  Canada ........................ 162/47
1097465  3/1981  Canada ........................ 162/47

Primary Examiner—Steve Alvo
Attorney, Agent, or Firm—Nixon & Vanderhye

[57] ABSTRACT

The number 2 flash tank of a black liquor energy recovery system associated with a continuous pulp digester is eliminated, and other advantages are obtained. After flashing in the number 1 flash tank, concentrated black liquor passes to a multiple effect evaporator system as the heating fluid supplied to the last effect. The heated black liquor passes in heat exchange relationship with excess make-up liquor from the high pressure feeder circulation system and/or with portions of the extracted black liquor that have had more of their heat content removed, the heated black liquor effecting evaporation of the excess make-up liquor and/or portions of the black liquor. Steam from the steam relief of the steaming vessel may be used as a secondary heating fluid source for the first effect.

11 Claims, 3 Drawing Sheets

MAKE-UP LIQUOR AND BLACK LIQUOR EVAPORATING PROCESSING DURING PULP PRODUCTION

This is a continuation of application Ser. No. 883,315 filed, July 8, 1986, now abandoned.

BACKGROUND AND SUMMARY OF THE INVENTION

In conventional facilities producing chemical pulp utilizing continuous digesters, the typical manner of handling the extracted black liquor from the continuous digester is to pass the black liquor to a first flash tank, and then to a second flash tank. The concentrated black liquor from the second flash tank is then passed to evaporators to be concentrated, steam being supplied to the first effect of the multiple effect evaporators, to provide the heat for effecting evaporation of the black liquor so that it is concentrated. The concentrated black liquor is then burned and/or subjected to chemical recovery, following known procedures. A conventional number 2 flash tank is a bulky, expensive, and space-consuming piece of equipment which heretofore has been found to be necessary, although undesirable.

In the practice of conventional continuous chemical pulp production procedures, oftentimes there is also the production of an excess amount (volume) of liquor entering the digester than required for cooking. The high pressure feeder, which feeds the comminuted cellulosic fibrous material (e.g. wood chips) slurry ultimately to the continuous digester (either directly or through an impregnation vessel, etc.) has a recirculation system which is designed to supply the desired amount of liquid to the chips so that proper feeding is effected. However oftentimes there is an excess volume of make-up liquor since the chips inherently have moisture in them, white liquor is added, and there is condensate from chips bin steaming, or from the steaming vessel steaming. Typically the excess make-up liquor is added to a white liquor supply to an impregnation vessel or the digester, utilizing a level tank. This procedure is less than ideal, however, since it utilizes a level tank as a distinct piece of equipment.

According to the present invention an apparatus and procedures are provided which overcome some of the undesirable aspects associated with the production of chemical pulp from conventional continuous digesters.

According to one aspect of the present invention, the number 2 flash tank is eliminated. The heated concentrated black liquor from the number 1 flash tank, instead of being passed to the number 2 flash tank, is used as the heating fluid for a multiple effect evaporator. This results in effective recovery of the energy of the black liquor, while it is being concentrated, does not normally require any additional effects for the evaporator system than would otherwise be provided, while allowing elimination of the undesirable number 2 flash tank.

The heated concentrated black liquor from the number 1 flash tank is passed into heat exchange relationship with other portions of the extracted black liquor which have had more of their heat content removed, resulting in evaporation of the black liquor and ultimately the desired concentration thereof. The concentrated black liquor, and the vapor from the black liquor evaporation, are handled in exactly the same manner as in the prior art (i.e. by any number of conventional techniques).

According to another aspect of the present invention, in addition to effecting concentration of itself, the heated black liquor is utilized to evaporate the excess make-up liquor, the evaporated excess make-up liquor then being utilized as steam for the chips bin and/or black liquor pre-evaporators, etc. Excess make-up liquor withdrawn from the conventional in-line drainers is passed directly to an evaporator as the evaporating liquid for the evaporator, so that the level tank—previously considered necessary—is eliminated. In subsequent effects of a multiple effect evaporator, black liquor is also evaporated. That portion of the excess make-up liquor that is not evaporated in the evaporator is merely returned to the high pressure inlet line to the high pressure feeder.

Where additional heat content is necessary to effect the desired amount of evaporation, the additional heat can be supplied from the steam relief of the conventional steaming vessel, and excess steam from number one flash tank, the steam from the steam relief and number one flash tank being fed to the first effect of the multiple effect evaporator, or make up liquor evaporator, along with the heated black liquor.

By practicing the present invention, not only are the heretofore considered necessary number 2 flash tank and make-up liquor level tank eliminated, other advantages accrue. For instance pulp production can be achieved using somewhat less energy since some of the water is eliminated from the digester (through evaporation of the excess make-up liquor), and therefore the need to heat the material entering or which has entered the digester with high pressure steam is minimized. Additionally, there is thus less extraction that is necessary throughout the continuous digestion process, or the same amount of extraction can be practiced by achieving better washing. This would allow minimizing the surface area of extraction screens, and/or effecting better washing. Also, the top circulation temperature can be stabilized, with resulting possibility of increasing the pulp quality. Also, some portion of the fresh low pressure steam that is fed to the chips bin or steaming vessel can be saved.

It is the primary object of the present invention to provide effective yet efficient evaporation of black liquor and/or make-up liquor. This and other objects of the invention will become clear from an inspection of the detailed description of the invention and from the appended claims.

DETAILED DESCRIPTION OF THE DRAWINGS

Figure 1:
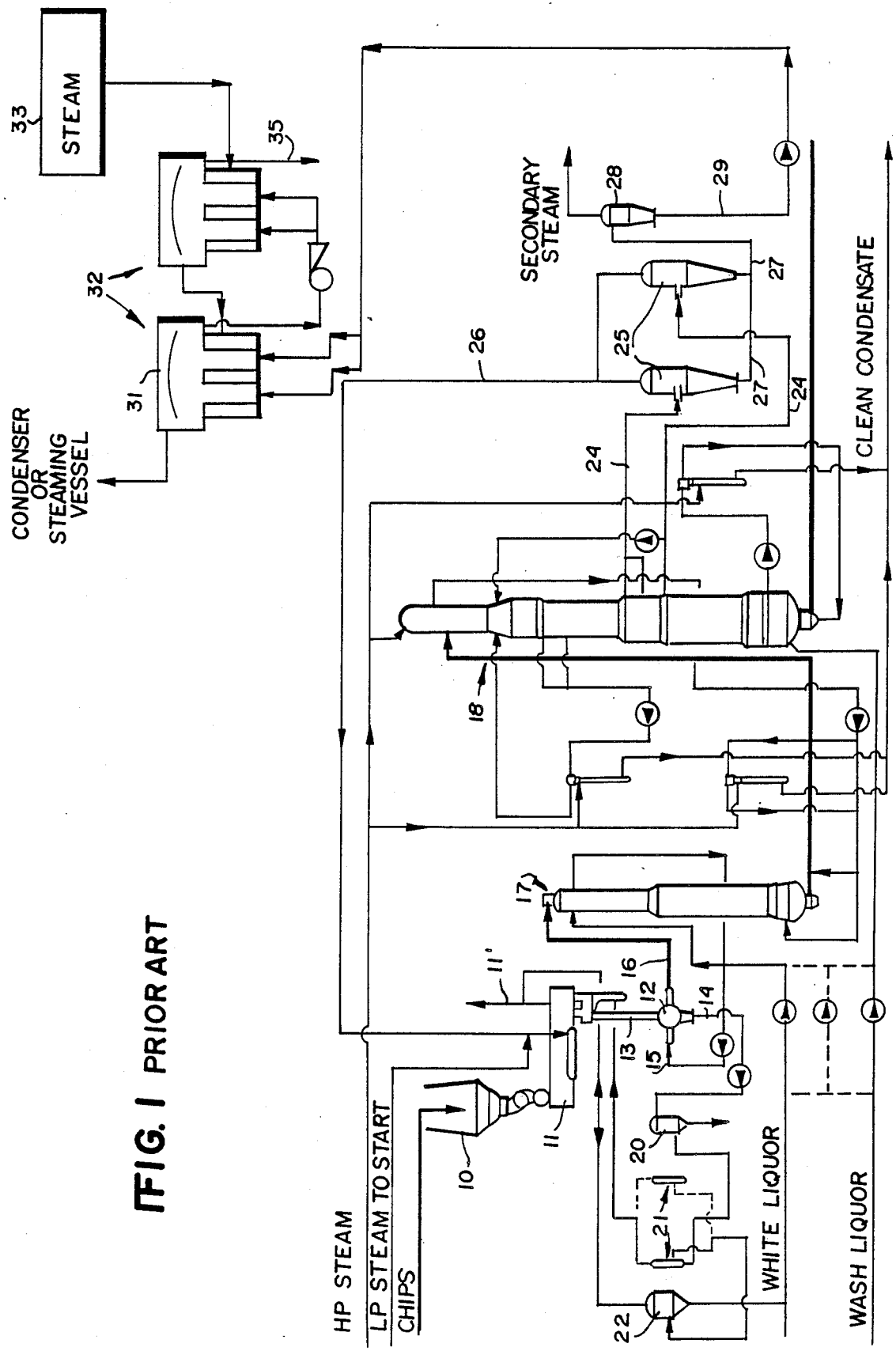
FIG. 1 is a schematic view of a conventional prior art continuous digester system.

FIG. 1 illustrates a conventional system for the continuous production of chemical paper pulp. The system actually illustrated in FIG. 1 is a conventional two vessel system. It should be understood, however, that a two vessel system has been illustrated only for clarity of the description of the invention, and the invention is equally applicable to hydraulic digesters, steam/liquor phase digesters, and other conventional systems Significant components of the conventional prior art system illustrated in FIG. 1 include the chips bin 10, steaming vessel 11, high pressure feeder 12, chute 13 for providing chips entrained in the liquid to the low pressure inlet to the high pressure feeder 12, low pressure outlet line 14 from the high pressure feeder 12, high pressure inlet line 15 to the high pressure feeder 12, and high pressure discharge line 16 from the high pressure feeder 12. The lines 15, 16 are operatively connected to an impregnation vessel 17, which in turn is operatively connected to a conventional continuous digester 18. In some steam/liquor phase systems, and some hydraulic systems, and the like, the impregnation vessel 17 is not utilized, but rather the high pressure feeder 12 is directly connected to the digester.

A make-up liquor recirculation system is associated with the high pressure feeder 12, which includes the sand separator 20 disposed in line 14, as well as one or more in-line drainers 21. Liquid which passes through the in-line drainers 21 is ultimately fed to be entrained with chips in the chute 13, while the excess liquor withdrawn from the drainers 21 passes to a level tank 22.

From the continuous digester 18, black liquor is withdrawn into line 24, which passes to the number 1 flash tank 25 (which may be a plurality of flash tanks) to produce steam in line 26, and concentrated heated black liquor in line 27. (The flash tank 25 may have the construction as illustrated in U.S. Pat. No. 4,551,198). The heated concentrated black liquor in line 27 passes to a number 2 flash tank 28 to produce secondary steam and liquor for recovery, the liquor for recovery passing in line 29. In order to practice recovery, liquor in line 29 is fed to the last effect 31 of a multiple effect evaporator system, shown schematically at 32, steam from source 33 being provided as the heating fluid for effecting evaporation in the system 32. The steam typically is fed to the first effect of the system 32, with the vapor produced in each effect utilized as the heating fluid in each subsequent effect. The final concentrated black liquor that is discharged from the first effect in line 35 is then passed to chemical recovery and/or to a burning station (furnace), utilizing any conventional techniques.

Figure 2:
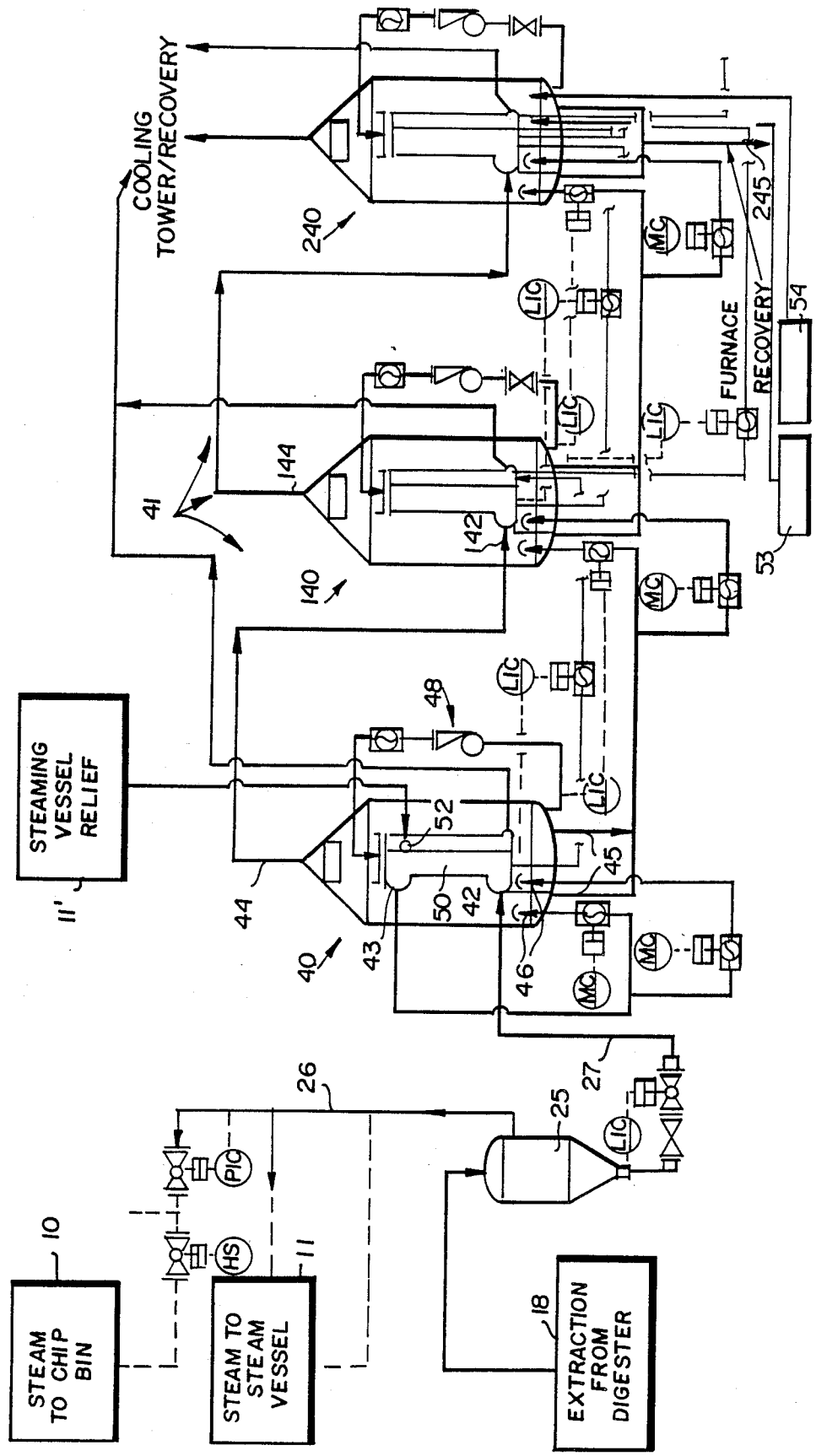
FIG. 2 is a schematic view illustrating exemplary apparatus according to the invention which eliminates the number 2 flash tank yet provides effective evaporation of the black liquor extracted from the continuous digester.

The exemplary apparatus according to the present invention illustrated in FIG. 2 eliminates the number 2 flash tank 28 of the system of FIG. 1, while still achieving the desired concentration of black liquor, and other advantages.

In the apparatus of FIG. 2, the concentrated heated black liquor in line 27 from the first set of flash tanks 25 is fed in line 27 directly to the first effect 40 of a multiple effect evaporator system, shown generally by reference numeral 41. The evaporator 40 includes—as is conventional—a heating fluid inlet 42, an outlet for the heating fluid 43, a vapor outlet 44, a liquid outlet or outlets 45, and one or more inlets 46. The inlets 46 are for the liquid to be evaporated; an inlet 46 is hereafter referred to as "an evaporating liquid inlet". The conventional evaporator 40, which may be of any suitable conventional type such as a Rosenblad falling film evaporator, also typically includes a recirculating system 48.

The heated concentrated black liquor line 27 from the number 1 flash tank 25 is, according to the embodiment of the invention illustrated in FIG. 2, connected directly to (i.e. without the intervention of the number 2 flash tank or the like) the heating fluid inlet 42 of the evaporator 40. Thus the heat content of the black liquor itself provides the necessary heat to effect evaporation in the evaporator 40.

In the system of FIG. 2, note that the heating liquid outlet 43 is directly connected to the evaporating liquid inlet 46 so that after some part of the heat from the black liquor has been extracted in the heat exchanger 50 within the evaporator 40, it becomes part of the evaporating liquid supply within the evaporator 40, and is recirculated by the recirculating system 48 to adjacent the top of the evaporator 40 to fall as a film down the heat exchanger 50, resulting in evaporation of a portion thereof.

In the multiple effect system 41 of FIG. 2, the vapor produced in line 44 is fed to the heating fluid inlet 142 of the next to last evaporator 140, and similarly with the vapor in line 144 from the next to last evaporator 140. The black liquor withdrawn through liquor outlets 45 from the first effect 40 is supplied to the inlets 146 to the next to last effect 140. Depending upon the particular system, only the one evaporator 40 need be provided, or a multiple effect evaporator 41 may be provided with any number of effects desired. Ultimately, the black liquor which has been concentrated and is withdrawn from line 245 from the last effect 240 is burned in a furnace, and/or subjected to chemical recovery, as is conventional.

In the system of FIG. 2, under some circumstances it may be necessary to provide additional heat to the evaporators in order to ensure that proper evaporation and concentration takes place. This may easily be accomplished by providing a secondary source of heating fluid through secondary inlet 52 in the heat exchanger 50. A good source for the secondary heating fluid is the steam from the conventional pressure relief 11' (see FIGS. 1 and 2) associated with the steaming vessel 11.

In a typical installation utilizing the apparatus of FIG. 2, the temperature of the heated concentrated black liquor in line 27 might be 258° F., the temperature of the steam vented from the steaming vessel relief 11' might be 235° F., the vapor in line 44 might have a temperature of 200° F., and the liquid in line 45 a temperature of 203° F. Also, where desired, additional liquids to be evaporated from other sources 53, 54 within the pulp mill, may be supplied to the last effect 240.

Figure 3:
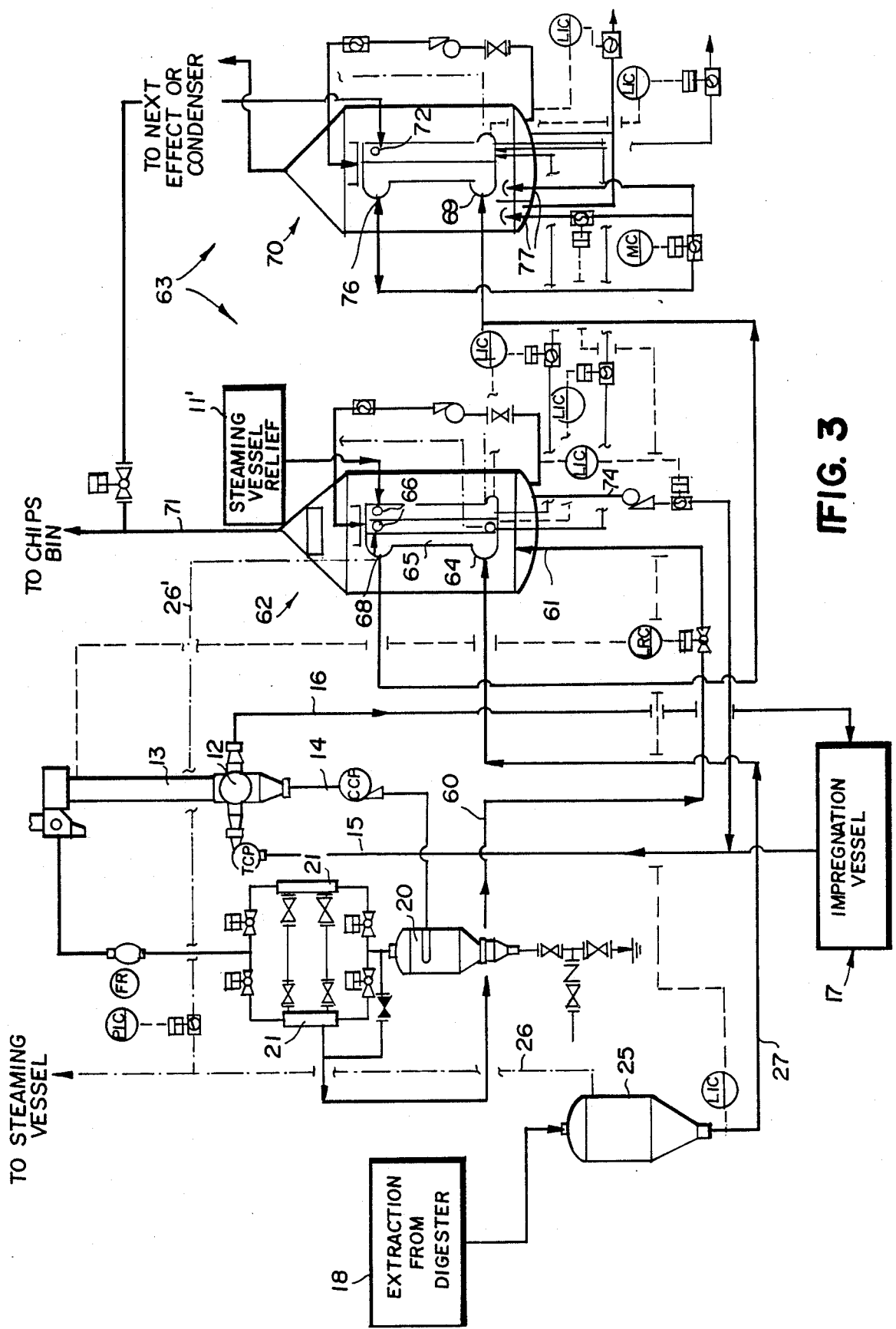
FIG. 3 is a schematic view of another embodiment of exemplary apparatus according to the present invention for effecting evaporation of both make-up liquor and black liquor.

In the apparatus of FIG. 3, make-up liquor is evaporated in addition to black liquor, and the level tank 22 provided in the prior art system is also eliminated.

In FIG. 3, the make-up liquor withdrawn from the in-line drainers 21, instead of passing to a level tank, passes in line 60 to be the evaporating liquor added to evaporating liquor inlet 61 to evaporator 62. The evaporator 62 preferably is the first effect of a multiple effect evaporator system shown generally by reference numeral 63. Note that in this embodiment too, the line 27 is connected up to the heating liquid inlet 64 to the heat exchanger 65 of the evaporator 62. If additional heat is necessary, that may be supplied to the secondary heating liquid inlet 66, which may comprise steam from the steaming vessel relief 11', and also steam, via line 26', from the number 1 flash tank 25.

In the FIG. 3 embodiment, the heated liquid outlet 68 is connected to the heated liquid inlet 69 for the next to last effect 70 of the multiple effect evaporator system 63. The vapor from vapor outlet 71 of the evaporator 62 can pass to the chips bin, and/or to a secondary heating liquid inlet 72 in the next to last evaporator 70. Excess make-up liquor from evaporator 62 which has not evaporated, but stays in liquid form, is withdrawn through liquid outlet 74, and can be returned to line 15 as illustrated in FIG. 3.

The next to last evaporator 70 in the FIG. 3 embodiment is essentially identical to the first effect evaporator 40 in the FIG. 2 embodiment, including the interconnection of the heated liquid outlet 76 to the evaporating liquid inlet 77. In the FIG. 3 embodiment, as in the FIG. 2 embodiment, any number of additional effects can be provided connected to the next to last effect 70, in order to accomplish the desired concentration of the black liquor.

Utilizing the apparatus of FIG. 2 it will be seen that a method of evaporating and concentrating black liquor during the production of chemical paper pulp from comminuted cellulosic fibrous material utilizing a continuous digester is provided, which method comprises the steps of: (a) Extracting black liquor from the continuous digester. (b) Passing the extracted black liquor in a flow path in which the black liquor is brought into heat exchange relationship with other portions of black liquor from other points in the flow path. And, (c) bringing portions of the black liquor in the flow path having relatively high heat content into heat exchange relationship with portions of black liquor in the flow path having relatively lower heat content, to effect evaporation of a portion of the black liquor having lower heat content.

Utilizing the apparatus of FIG. 3, a method is provided of evaporating excess make-up liquor during the production of chemical paper pulp utilizing a continuous digester ultimately fed by a high pressure feeder having an inlet for comminuted cellulosic fibrous material entrained in liquid, a low pressure liquid outlet, a high pressure liquid inlet, and a high pressure material entrained in liquid outlet. The method comprises the steps of: (a) Withdrawing black liquor from the continuous digester. (b) Flashing the black liquor in a first flash tank to produce steam and a concentrated, heated black liquor. (c) Withdrawing excess make-up liquor from the low pressure liquid line associated with the high pressure feeder. And, (d) passing the concentrated heated black liquor from the flash tank in heat exchange relationship with the excess make-up liquor so as to effect evaporation of at least a portion of the excess make-up liquor.

Practicing the method according to the invention, and utilizing the apparatus, it will thus be seen that two pieces of equipment thought necessary in prior art processes and facilities for producing chemical pulp utilizing continuous digesters have been eliminated, however their functions are not eliminated and in fact the processing of the pulp is ultimately enhanced. Since some of the excess of make-up water is eliminated, the energy necessary to heat that liquid during digestion, the screen area necessary to extract that liquid, and the amount of fresh low pressure steam for the steaming vessel can be reduced. Also, the top circulation temperature can be stabilized, with ultimately better pulp quality production.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. Apparatus for evaporating liquor during the production of paper pulp from fibrous comminuted cellulosic material, comprising:
    a continuous digester having a black liquor extraction outlet;
    a first discrete flash tank operatively connected to said black liquor extraction outlet, and having a steam outlet therefrom, and a concentrated black liquor outlet therefrom;
    at least one discrete evaporator having a first inlet for the black liquor and a first outlet therefor, a first conduit for flowing black liquor from said first inlet to said first outlet, a vapor outlet, a second inlet for the black liquor and a second conduit for communicating the black liquor from said first outlet to said second inlet, a second outlet and a third conduit for communicating the black liquor from said second inlet to said second outlet; and
    means in said evaporator for effecting heat exchange between the black liquor flowing in said first conduit from said first inlet to said first outlet and the black liquor flowing in said third conduit from said second inlet to said second outlet;
    means for directly connecting said concentrated liquor outlet from said first flash tank without intervening heat exchange and said first inlet so that the heat content of the black liquor flowing in said first conduit from said first inlet to said first outlet in heat exchange relation with the black liquor flowing in said third conduit effects evaporation of the black liquor in said third conduit to produce vapor which is discharged from the vapor outlet of the evaporator.

2. Apparatus as recited in claim 1 wherein said evaporator comprises the first effect of a multiple effect evaporator assembly.

3. Apparatus as recited in claim 2 wherein the vapor outlet from said first effect is connected to the first black liquor inlet for the next effect.

4. Apparatus as recited in claim 3 further comprising a secondary heating fluid inlet to said evaporator to which a source of heating fluid, distinct from said black liquor outlet from said first flash tank, is connected.

5. Apparatus as recited in claim 4 further comprising a steaming vessel for steaming comminuted cellulosic fibrous material before feeding to said digester; and wherein said secondary heating fluid inlet comprises the relief from said steaming vessel.

6. Apparatus for evaporating liquor during the production of paper pulp from fibrous comminuted cellulosic material, comprising:
    a continuous digester having a black liquor extraction outlet;
    a first flash tank operatively connected to said black liquor extraction outlet, and having a steam outlet therefrom, and a concentrated black liquor outlet therefrom;
    at least one evaporator having a heating fluid inlet, a vapor outlet, a make-up liquid inlet, and a liquid outlet;
    said concentrated liquor outlet from said first flash tank being directly connected to said heating fluid inlet of said evaporator so that the heat content from the black liquor effects evaporation of make-up liquid to produce vapor which is discharged from the vapor outlet of the evaporator; and a high pressure feeding device for feeding the comminuted cellulosic fibrous material entrained in liquid ultimately to said digester, and including a low pressure liquid line for low pressure liquid discharged from said high pressure feeding device, and at least one in-line drainer for draining excess liquid from said low pressure liquid line, while recirculating the rest of said liquid to the low pressure inlet for the high pressure feeder, said at least one in-line drainer having a drained make-up liquid outlet; and wherein said drained make-up liquid outlet is operatively connected to said make-up liquid inlet of said evaporator to supply make-up liquid thereto.

7. Apparatus as recited in claim 6 wherein said evaporator comprises 9 first effect of a multiple effect evaporator system, and wherein said evaporator includes a heating fluid outlet; and wherein said heating fluid outlet from said first effect evaporator is operatively connected to a heating fluid inlet of a second effect.

8. Apparatus as recited in claim 7 wherein said second effect has a heating fluid outlet; and wherein said heating fluid outlet from said second effect is operatively connected to an evaporating liquid inlet for said second effect, so that in said second effect black liquor is evaporated.

9. Apparatus as recited in claim 8 wherein said liquid outlet from said first effect evaporator is operatively connected to a high pressure inlet to a high pressure feeder.

10. Apparatus as recited in claim 8 wherein the heating fluid inlet for a third effect is operatively connected to a vapor outlet from said second effect.

11. Apparatus as recited in claim 6 further comprising a secondary heating fluid inlet to said evaporator connected to a source of heating fluid distinct from said concentrated black liquor outlet from said flash tank.

* * * * *